United States Patent Office 2,726,383
Patented Dec. 6, 1955

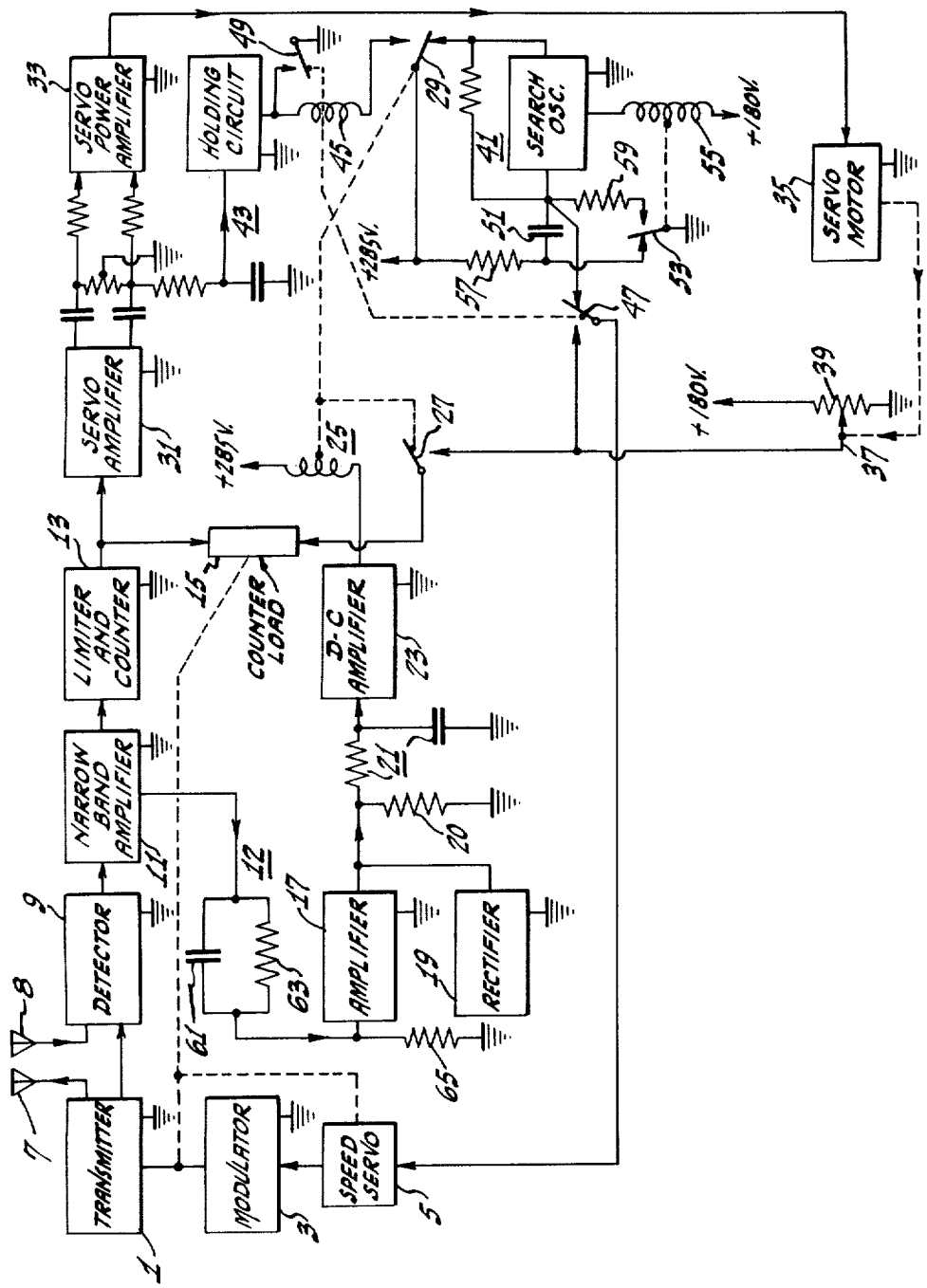

2,726,383

FREQUENCY MODULATED RADIO DISTANCE MEASURING SYSTEM

Ted E. Dunn, Pennsauken, N. J., assignor to Radio Corporation of America, a corporation of Delaware Application December 29, 1951, Serial No. 264,038

7 Claims. (Cl. 343—14)

This invention relates generally to radio distance measuring systems such as absolute altimeters or terrain clearance indicators, and more particularly to a search circuit for use with a frequency-modulated type of distance measuring system in which the modulation rate of frequency-modulated signals transmitted thereby is a function of the distance to be measured.

In some previous F-M type distance measuring systems, for example, that which is described in U. S. Patent No. 2,533,898 granted to D. H. Robinson and T. E. Dunn on December 12, 1950, transmitted frequency-modulated signals reflected from a remote wave reflecting surface are mixed with part of the transmitter output at the instant at which the refleced signals are received. The frequency of a modulation, or beat, signal derived from this mixing action is indicative of and corresponds to the distance measured.

Normally, in such a system, the frequency variation per foot of distance measured may be of the order of sixteen cycles per second. If utilized as a radio altimeter, it is then apparent that an altitude measurement of 10,000 feet requires a system band pass of approximately 160,000 cycles. While it is possible to operate the system with the beat signal frequency varying over such a wide portion of the frequency spectrum, improved performance and an improved signal-to-noise ratio may be obtained by varying the modulation rate of the transmitted frequency-modulated signals as a function of the aircraft's altitude. This type system is described in my copending application Serial No. 190,771, filed October 18, 1950, now U. S. Patent 2,695,996 issued November 30, 1954, entitled "Frequency Modulated Radar." The beat signals therein produced are confined to a relatively narrow band-width by varying the modulation rate of the transmitted F-M signals as a function of the distance measured. This affords a beat frequency signal which may vary within well-defined limits and which may be amplified in an amplifier having a variable gain versus frequency characteristic to afford an improved signal-to-noise ratio. In this case, the frequency of the beat signal alone is not indicative of the distance measured but the distance is determined from the ratio of the beat signal frequency to the aforesaid modulation rate.

A serious problem is encountered, however, in practising a system of this type when the modulation rate of the transmitted F-M signals is incorrect for a given altitude. This generally occurs when the altimeter is turned on at an altitude which substantially differs from the altitude at which the altimeter was last turned off. The beat signal then produced may be too far outside the frequency band of the amplifier for signals to be passed by the amplifier, hence the system may respond to noise or other undesirable signals to provide false and erroneous indications. This apparent defect wherein the altimeter is not responsive to the beat signals produced in the mixing action is sometimes called altimeter "lockout."

The instant invention obviates this and other disadvantages of previous systems by providing means effective during this lockout condition for sweeping the modulation rate of the transmitted frequency-modulated signals throughout the operating range of the system such that, at some point therein, the said rate is correct for the distance to be measured. The resulting beat signal then falls within the prescribed part of the frequency spectrum in which beat signals are passed by the system and normal system operation thereafter ensues.

An object of the instant invention is to provide an improved frequency-modulated type radio distance measuring system.

Another object of the invention is to provide an improved frequency-modulated type of radio distance measuring system in which the rate of modulation of transmitted frequency-modulated signals is a function of distance.

A further object of the invention is to conserve the effective band-width and increase the signal-to-noise ratio of such systems.

A still further object of the invention is to provide a frequency-modulated type of radio altimeter not subject to a condition of "lockout."

According to the typical embodiment of the instant invention, adapted for use as a radio altimeter, transmitted frequency-modulated signals, after reflection from the ground, are mixed with a portion of the frequency-modulated signal energy being transmitted at the instant of reception of the reflected signals. The modulation rate of the transmitted signals is a function of the altitude of the aircraft so that the beat signal obtained from the mixing may fall within a prescribed frequency range, which, by way of example, may be between 83 and 16,000 cycles per second.

At an altitude of 500 feet, the modulation rate may be such that 83 frequency swings per second are made by the transmitter, while at 10,000 feet, the rate may be only 8.3 frequency swings per second. It is then obvious, from the proper selection of modulation rates, and from taking into consideration the distances involved that the beat signal derived in either situation may fall within the fixed frequency band.

If the aircraft changes altitude, the beat signal frequency changes if the F-M modulation rate and the transmitter-band-width are constant. Above a given altitude, however, as an aircraft's altitude changes, the aforesaid rate is changed to maintain the frequency of the beat signal within reasonable limits. In my copending application, Serial No. 190,771, cited above, it is indicated that it is not necessary that the modulation rate instantaneously change with changes in altitude. It is only necessary that the rate be maintained sufficiently near the value for producing a satisfactory signal-to-noise ratio for subsequently determining the ratio of beat signal frequency to modulation rate. It is this ratio which affords a measure of the craft's altitude. The modulation rate may be relatively high for low altitudes, say up to 500 feet. At intermediate altitudes, which may be between 500 and 1000 feet, the normal change in beat signal frequency with altitude may be reduced by changing the modulation rate of these F-M swings to partially compensate for changes in altitude. At even higher altitudes, such as 10,000 feet, the modulation rate is changed such that the nominal values of beat signal frequencies at 1000 feet and 10,000 feet are substantially the same.

Assume, however, that the altimeter was last turned off after the aircraft had landed from a particular flight, and that on the next subsequent flight the altimeter is not turned on until the craft is at an altitude of, say, 7500 feet. It is apparent that the modulation rate for the transmitted signals is set for zero altitude and is incorrect for the actual altitude. The beat frequency signal may be 100,000 cycles per second or greater and hence not within the band pass of the system. "Lockout" then occurs.

To obviate this condition, the instant invention includes a search circuit which operates initially independently of the distance to be measured for sweeping the modulation rate of the transmitted signals throughout the operating range of the system until the rate is approximately correct for the distance measured. At that time a beat signal is produced which is sufficient to properly actuate a device for indicating said distance. The altimeter operates thereafter in a normal manner, the search circuit being engaged only when the mixer beat signal is not passed by subsequent radio altimeter circuitry.

The invention will be described in greater detail with reference to the accompanying drawing in which the single figure is a schematic diagram, partially in block form, of a frequency-modulated type distance measuring system, according to the invention.

*Normal altimeter operation*

Referring to the drawing, a radio transmitter 1 is modulated in frequency by a modulator unit 3 to produce transmitted frequency-modulated signals, the frequency of which varies substantially linearly with time and in a triangular manner (i. e. frequency versus time). The modulation rate of the transmitted frequency-modulated signals may be controlled by a variable speed device such as a speed servo 5. The transmitter 1 radiates signals generated therein from an antenna 7, preferably directive in characteristic. After reflection of the radiated signals by a remote wave reflecting surface (not shown), the received reflected signals are combined in a mixer 9 with a portion of the transmitter output. This output is the same frequency as the signals being radiated at the instant at which the reflected signals are received. Assuming that the speed servo 5 is driving the modulator unit 3 at the proper modulation rate for the distance, or in this case altitude, to be measured, the beat signal obtained through this mixing action is passed by a narrow band amplifier 11 having a variable gain versus frequency characteristic. Beat signals passed by the amplifier are limited and the frequency thereof measured in limiter and counter circuit 13. A voltage obtained therein is developed across a counter load 15. A detailed description of the counter arrangement and the load therefor may be obtained in my above-referenced copending application, Serial No. 190,771.

Simultaneous with the passage of beat signals for limiting and counting, the narrow band amplifier 11 also couples the beat signals through a "de-emphasis" network 12, the significance of which will be described later. The beat signals passed by the "de-emphasis" network 12 are then amplified in a conventional amplifier 17 and applied to a rectifier 19 which conducts current on negative peaks of input signals to develop a peak voltage signal across a load resistor 20. This signal is integrated in an integrating circuit 21 and is utilized to overcome the bias of a normally cut-off D. C. amplifier 23. A relay coil 25 in the D. C. amplifier output circuit is then energized.

The output signal from the limiter and counter circuit 13 is also applied to a servo amplifier 31. The amplifier output drives a servo power amplifier 33 which in turn drives a servo motor 35. The servo motor is mechanically connected to drive a movable arm 37 of a potentiometer 39. The potentiometer arm 37 is electrically connected through a switch contact 27 of the relay coil 25 to the counter load 15. The internal EMF of the counter, its effective internal resistance, the effective resistance of the counter load 15, and the EMF on the potentiometer arm 37 constitute a bridge circuit which becomes unbalanced with changes in altitude. The servo loop comprising the servo amplifier 31, power amplifier 33, and motor 35 are utilized to rebalance this bridge arrangement.

*Operation during lockout*

For the previously mentioned condition of "lockout," the system operation is as follows. With beat signals being produced which are out of the effective band pass of the narrow band amplifier 11, the relay coil 25 in the output circuit of the D. C. amplifier 23 is de-energized and the switch contacts 27 and 29 associated therewith make contact, respectively, to disconnect the counter load 15 from the potentiometer arm 37 and to apply B+ to excite a search oscillator 41 for producing sawtooth wave signals. In applying B+ to the search oscillator 41, the contact 29 disconnects B+ from the anode circuit of a holding circuit 43. The anode circuit thereof includes a relay coil 45 normally supplied with current through one of its switch contacts 49 and through the switch contact 29 of the relay 25. However, with B+ removed from one end of the coil, the coil 45 is de-energized and the contacts 47 and 49 controlled by the coil are then actuated to, respectively, connect the output of the sawtooth oscillator 41 to the speed servo 5 and to remove the ground from the remaining end of search relay control coil 45. At intervals in which the sawtooth oscillator is connected to the speed servo, and in which the potentiometer arm (which controls the altitude indication) is disconnected from the counter load 15, spurious noise signals cause some counter output which results in a large signal being applied to the servo loop whereby the potentiometer arm 37, to which an indicator (not shown) is preferably geared, is driven to the top of its scale.

The search oscillator 41 causes the speed servo 5 to sweep throughout its speed range to vary the modulation rate of the transmitter 1, initially independent of the craft's altitude, through the operable range of the system. At some point within that range, the modulation rate is substantially correct for the actual altitude of the craft. A beat signal, within the pass range of the narrow band amplifier 11, may then be obtained sufficient to re-energize the relay 25. It is emphasized that the function of the speed servo 5 is to maintain the beat signal frequency within the pass band of the amplifier 11. At altitudes where the beat signal is strong, the modulation rate may be changed by as much as a factor often without affecting the altitude reading more than one percent. In any case a change in the modulation rate by ten to twenty percent has little effect upon the altitude reading.

Having obtained the proper modulation rate for producing a suitable beat signal, it then is necesasry to provide some means for "remembering" this rate until the mechanical operation of the servomotor 35 in driving the potentiometer arm 37 to the position on the potentiometer 39 representative of the proper modulation rate may be effected. If no memory circuit is provided for "holding" the modulation rate at the desired value, intermittent operation of search circuitry would ensue. This may be achieved, according to a further feature of the invention, in the following manner. With B+ applied to the anode of the search oscillator 41, a capacitor 51 in the grid circuit thereof charges through a switch contact 53 associated with and controlled by a relay coil 55 in the oscillator cathode circuit. The cathode may be operated at a positive potential of the order of 180 volts, hence the search oscillator tube 41 does not conduct until the capacitor 51 charges to approximately a positive 185 volts. When the tube conducts, current flowing through the search oscillator relay coil 55 actuates the relay to the position of the contact 53 and the capacitor then discharges through a current limiting resistor 57, through the switch contact 53, a further limiting resistor 59 and the grid of the tube of the search oscillator 41. The effective addition of the capacitor voltage to the B+ supply voltage causes the search relay to operate with snap action.

The reception of the beat signal, however, in re-energizing the relay 25 removes B+ from the search oscillator and thereby opens the charging circuit of the capacitor 51 such that the voltage developed acros the capacitor at that time is the voltage necesary for the speed servo to modulate the transmitter 1 at substantially the correct modulation rate for the altitude of the craft. In order that this potential be maintained and supplied to the speed servo 5 until the potentiometer arm 37 is mechanically driven to a corresponding position on the potentiometer 39, a holding circuit 43 is coupled to the previously mentioned servo amplifier 31. The large error signal applied to the amplifier 31 maintains the holding circuit in cut-off, even though B+ has been re-applied thereto, until the error has been reduced to a substantially small value. When the error signal is sufficiently small to allow conduction in the holding circuit 43, current flowing in the relay coil 45 thereof operates switch contacts 49 and 47 which, respectively, serve to reconnect ground to one side of the coil and disconnect the sawtooth search oscillator 41 from the speed servo. The voltage measured by the potentiometer arm 37 then resumes control of the modulation rate of the transmitted F-M signals and normal system operation follows.

De-emphasis network

The aforementioned "de-emphasis" network 12 is utilized to eliminate false indications during "lockout." Such indications may be caused by signals which feed across from the transmitter antenna 7 to the receiver antenna 8. These antennae are generally spaced near each other and it is obvious that the relatively large amplitude low-frequency feed-through signals may tend to overpower the receiver. The frequency response of amplifier 11, to some extent, discriminates against the low-frequency feed-through signals. However, in the absence of a beat signal occurring within the desired portion of the amplifier band pass, a more effective filtering arrangement is preferable. This is afforded in the above mentioned network 12 which comprises a parallel connected combination of a capacitor 61 and a resistor 63 in series with the grid input resistor 65 of the amplifier 17. The capacitor 61 shunting the resistor 63 presents high impedance to low-frequency signals (feed-through signals, etc.) so that the amplitude of the low-frequency signals applied to the amplifier 17 are relatively small compared to the amplitude of beat signals normally received. This filtering action prevents undesirably energizing the dropout relay 25. For beat signals within the band pass of the narrow band amplifier 11, the capacitor attenuation is substantially reduced, hence a considerably greater amplitude signal is developed across the amplifier input resistor 65 for subsequently actuating the dropout relay.

Thus the system operation has been described for both normal and lockout conditions. It is apparent that the system of the instant invention affords several distinct advantages not offered in previous systems. At any time at which the reflected signal is too weak for utilization or when the transmitter modulation rate is incorrect for a given distance, the search device is automatically engaged to operate until a suitable indication is obtained. An improved signal-to-noise ratio is obtained by utilizing the narrow band amplification of beat signals, and also the de-emphasis network reduces the effect of feed-through ("cross-talk") between the relatively closely spaced transmitting and receiving antennae.

What is claimed is:

1. A radio distance measuring system comprising, means for transmitting frequency-modulated signals for reflection from a remote wave reflecting surface, means for controlling the modulation rate of said frequency-modulated signals as an inverse function of the distance between said signal transmitting means and said surface, means for receiving said frequency-modulated signals after reflection from said surface, means for combining said received signals with said transmitted signals to produce beat frequency signals in response thereto, means including a bandpass filter responsive to passage of beat signals through said filter to produce a voltage having a first amplitude level and responsive to the absence of signals at the output of said filter to produce a voltage having a second amplitude level, and means responsive to said second voltage amplitude level for varying said modulation rate to produce beat frequency signals at the output of said bandpass filter.

2. A radio distance measuring system comprising, means for transmitting frequency-modulated signals for reflection from a remote wave reflecting surface, means for controlling the modulation rate of said frequency-modulated signals as an inverse function of the distance between said signal transmitting means and said surface, means for receiving said frequency-modulated signals after reflection from said surface, means for combining said received signals with said transmitted signals to produce beat frequency signals in response thereto, means including a bandpass filter responsive to passage of beat signals through said filter to produce a voltage having a first amplitude level and responsive to the absence of signals at the output of said filter to produce a voltage having a second amplitude level, means including indicator means responsive to beat signals passed by said filter for computing and indicating said distance, and means responsive to said second voltage amplitude level for de-enabling said indicator means and simultaneously varying said modulation rate to a value determined by said distance for producing a beat signal from said filter.

3. A radio distance measuring system comprising means for transmitting frequency-modulated signals for reflection from a remote wave reflecting surface, a speed servo for controlling the modulation rate of said frequency-modulated signals as an inverse function of the distance between said signal transmitting means and said surface, means for receiving said frequency-modulated signals after reflection from said surface, means for combining said received signal with said transmitted signals for producing beat signals in response thereto, means including a bandpass filter responsive to the passage of beat signals through said filter to produce a voltage having a first amplitude level and responsive to the absence of signals at the output of said filter to produce a voltage having a second amplitude level, means including indicator means responsive to beat signals passed by said filter for computing and indicating said distance, means coupled to said filter means and responsive to said second voltage amplitude level for de-enabling said indicator means and simultaneously adjusting said modulation rate to a value determined by said distance for deriving a beat signal from said filter, and means for maintaining said modulation rate at said value until said indicator means is re-enabled.

4. A radio distance measuring system comprising, means for transmitting frequency-modulated signals for reflection from a remote wave reflecting object, a speed servo for controlling the modulation rate of said frequency-modulated signals as an inverse function of the distance between said signal transmitting means and said surface, means for receiving said frequency-modulated signals after reflection from said surface, means for combining said received signals with said transmitted signals for producing beat signals in response thereto, means including amplifier means for amplifying beat signals within a predetermined frequency band to produce a voltage having a first amplitude level, said means providing a voltage having a second amplitude level in the absence of beat signals at the output of said amplifier, means including indicator means responsive to said beat signals for computing and indicating said distance, means coupled to said amplifier means responsive to said second voltage amplitude level for de-enabling said indicator means and simultaneously changing the speed of said servo to adjust said modulation rate to a value determined by said distance for deriving a beat signal from said amplifier, and means for maintaining said modulation rate at said value until said indicator means is re-enabled.

5. A radio distance measuring system as claimed in claim 4 including a high pass filter network coupled between said amplifier means and said indicator de-enabling means.

6. A radio distance measuring system comprising means for transmitting frequency-modulated signals for reflection from a remote wave reflecting surface, means for controlling the modulation rate of said frequency-modulated signals as an inverse function of the distance between said signal transmitting means and said surface, means for receiving said frequency-modulated signals after reflection from said surface, means for combining said received signals with said transmitted signals to produce beat frequency signals in response thereto, means including amplifier means for amplifying beat signals within a predetermined frequency band to produce a voltage having a first amplitude level, said means providing a second voltage amplitude level in the absence of beat signals at the output of said amplifier, limiter means coupled to said amplifier means for limiting the amplitude of said beat signals passed by said amplifier, counter means in circuit with servo loop means which includes indicator means, responsive to said limited beat signals for computing and indicating said distance, and means responsive to said second voltage amplitude level for de-enabling said indicator means and simultaneously altering the speed of said servo to adjust said modulation rate to a value determined by said distance for deriving a beat signal from said amplifier.

7. A radio distance measuring system as claimed in claim 6 including means comprising storage means for maintaining said modulation rate at said value until said indicator means is re-enabled.

References Cited in the file of this patent
UNITED STATES PATENTS

| | | |
|---|---|---|
| 2,505,692 | Staal | Apr. 25, 1950 |
| 2,512,330 | Hendrich | June 20, 1950 |
| 2,541,454 | White | Feb. 13, 1951 |
| 2,601,436 | Hugenholtz | June 24, 1952 |

Notice of Adverse Decision in Interference

In Interference No. 88,544 involving Patent No. 2,726,383, T. E. Dunn, Frequency modulated radio distance measuring system, final judgment adverse to the patentee was rendered July 11, 1957, as to claim 1.

[*Official Gazette August 27, 1957.*]